(12) United States Patent
Richards et al.

(10) Patent No.: US 7,481,959 B2
(45) Date of Patent: Jan. 27, 2009

(54) METHOD FOR CONTROLLING HAZE IN AN ARTICLE COMPRISING A POLYMER COMPOSITION

(75) Inventors: William David Richards, Scotia, NY (US); Farid Fouad Khouri, Clifton Park, NY (US); Thomas Link Guggenheim, Mt. Vernon, IN (US)

(73) Assignee: SABIC Innovative Plastics IP B.V., Pittsfield, MA (US)

( * ) Notice: Subject to any disclaimer, the term of this patent is extended or adjusted under 35 U.S.C. 154(b) by 766 days.

(21) Appl. No.: 10/955,740

(22) Filed: Sep. 30, 2004

(65) Prior Publication Data

US 2006/0066004 A1   Mar. 30, 2006

(51) Int. Cl.
*C08G 73/16*   (2006.01)

(52) U.S. Cl. .................... 264/331.12; 524/464; 528/488

(58) Field of Classification Search .... 264/330–331.22; 528/488; 524/464
See application file for complete search history.

(56) References Cited

U.S. PATENT DOCUMENTS

| | | | |
|---|---|---|---|
| 6,221,940 | B1 | 4/2001 | Puyenbroek et al. |
| 2002/0151675 | A1 | 10/2002 | Johnson et al. |

FOREIGN PATENT DOCUMENTS

WO   WO 01/21686   3/2001

OTHER PUBLICATIONS

International Search Report dated Mar. 28, 2006.

*Primary Examiner*—Robert B Davis

(57) ABSTRACT

A method for controlling haze in an article comprising a polymer composition, said method comprising providing a polymer composition comprising less than 25 parts per million alkali metal halide; and fabricating an article from said polymer composition.

16 Claims, 1 Drawing Sheet

METHOD FOR CONTROLLING HAZE IN AN ARTICLE COMPRISING A POLYMER COMPOSITION

BACKGROUND OF THE INVENTION

This invention relates to a method for controlling haze in an article comprising a polymer composition. More particularly the method relates to controlling haze in articles comprising polymer compositions, which compositions comprise an alkali metal halide.

An almost infinite variety of articles comprising polymeric materials form an integral part of modern commerce and technology. The utility of many such articles depends upon the transparent nature of the polymer composition from which the article is fabricated. In many applications requiring a high degree of optical clarity, the haze level exhibited by the article cannot exceed a certain threshold level. Certain polymer compositions exhibit a very high level of transparency and low haze values, for example, polycarbonate. However, other physical properties of such materials, for example glass transition temperature, make them unsuitable for use in many applications requiring both a high level of optical clarity and substantial resistance to the effects of heat. Many polymer compositions are available which possess outstanding heat resistance, but which are prone to afford articles fabricated from said polymer compositions which exhibit an unacceptable level of haze.

In some instances, the level of haze exhibited by an article comprising a polymer composition is found to be dependent upon the method by which the polymer composition itself is prepared. For example, articles fabricated using polyetherimide polymer compositions exhibit higher or lower levels of haze depending on the method used to prepare the constituent polyetherimide. Polyetherimide compositions are commercially attractive materials due to their combination of high heat performance, good mechanical properties, chemical resistance and ease of processing. Commercial Ultem® polyetherimide compositions find applications in dishware, film, silicon wafer carriers, and like applications, wherein, low haze is a critical quality factor. Typical haze levels of commercial Ultem® polyetherimide compositions are found to be below 2%.

As noted, however, the haze levels exhibited by articles fabricated from polyetherimide compositions are dependent on the process followed to prepare them. Currently, commercially available polyetherimide compositions are produced using a "nitro-displacement" process to generate bisphenol-A dianhydride (BPADA) in a series of steps starting from a mixture of 3-nitro- and 4-nitro-N-methylphthalimide. The polyetherimide composition is then prepared in a condensation polymerization of the BPADA with a diamine, such as meta-phenylenediamine. In an alternate approach, the diamine is first reacted with chlorophthalic anhydride to form a bis-chlorophthalimide, which is then reacted with the alkali metal salt of a bisphenol (e.g. bisphenol A disodium salt) in a "chloro-displacement" polymerization process. In contrast to the nitro-displacement process, the chloro-displacement process appears to have advantages with respect to both process simplicity and compositional flexibility. However, articles fabricated using polyetherimide prepared using the "chloro-displacement" process were found unaccountably to exhibit significantly higher haze levels than articles fabricated using polyetherimide made by the "nitro-displacement" process. The higher haze levels observed in articles fabricated using polyetherimide prepared using "chloro-displacement" polymerization detracts significantly from the commercial attractiveness of the "chloro-displacement" process technology.

Hence, there exists a need to provide a method for controlling haze in an article comprising polymer compositions, and particularly in articles comprising polymer compositions prepared using methods allied to the chloro-displacement process used to prepare polyetherimide compositions.

BRIEF SUMMARY OF THE INVENTION

In one aspect the present invention provides a method for controlling haze in an article comprising a polymer composition, said method comprising:

(a) providing a polymer composition comprising less than about 25 parts per million alkali metal halide; and (b) fabricating an article from said polymer composition.

In a further aspect the present invention provides a method for controlling haze in an article comprising a polyetherimide composition, said method comprising:

(a) providing a polyetherimide composition comprising less than about 25 parts per million alkali metal chloride; and (b) fabricating an article from said polyetherimide composition.

BRIEF DESCRIPTION OF FIGURE

FIG. I shows the correlation between sodium chloride concentration in polyetherimide resin prepared via the chloro-displacement polymerization process and haze in standard test articles prepared from the polyetherimide resins. The solid lines are model predictions for haze resulting from the presence of sodium chloride particles of 1 and 2 micrometer (μm) average size.

DETAILED DESCRIPTION OF THE INVENTION

Figure 1:
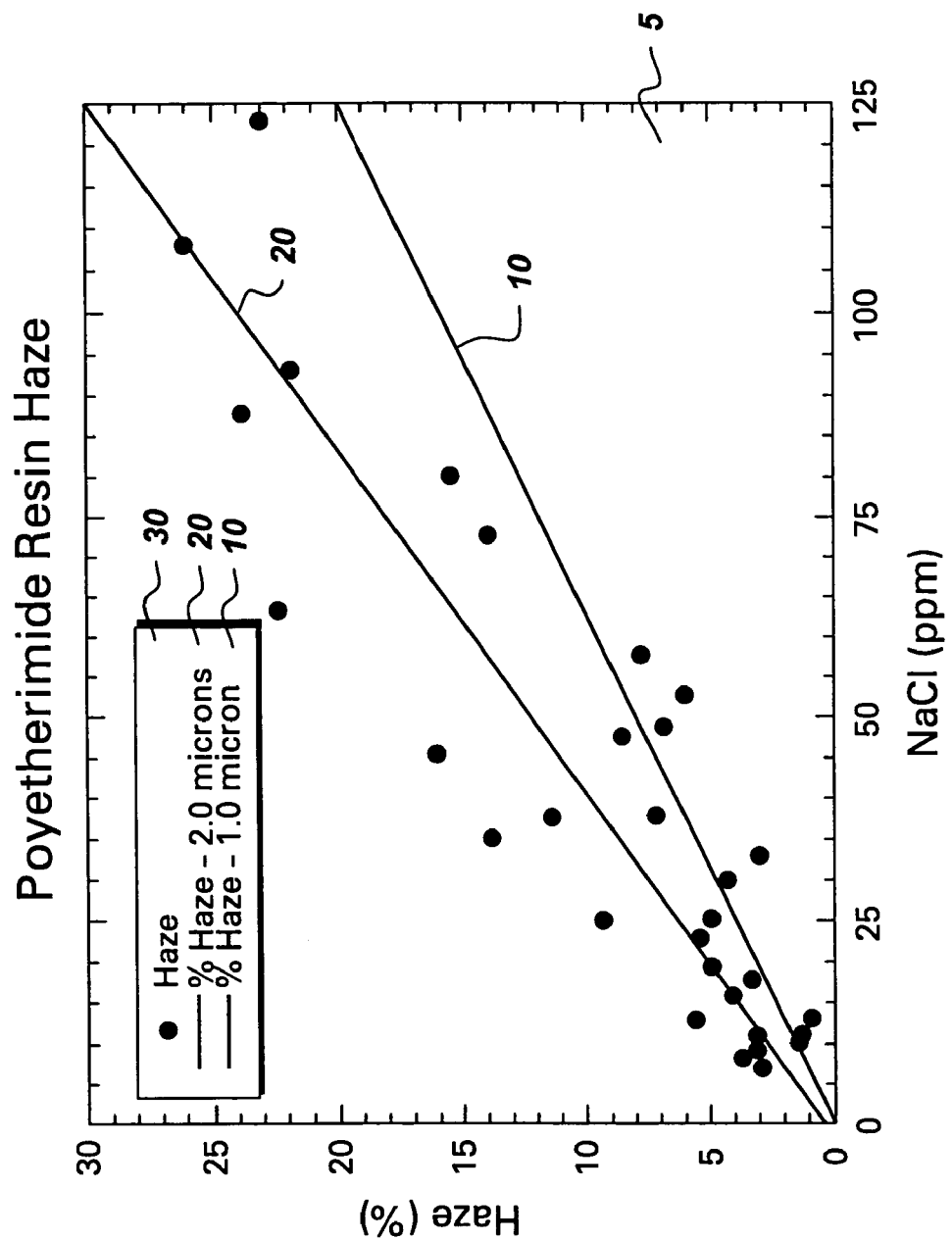

The present invention may be understood more readily with reference to the following detailed description of preferred embodiments of the invention and the examples included therein. In the following specification and the claims which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "aliphatic radical" refers to a radical having a valence of at least one comprising a linear or branched array of atoms which is not cyclic. The array may include heteroatoms such as nitrogen, sulfur, silicon, selenium and oxygen or may be composed exclusively of carbon and hydrogen. Aliphatic radicals may be "substituted" or "unsubstituted". A substituted aliphatic radical is defined as an aliphatic radical which comprises at least one substituent. A substituted aliphatic radical may comprise as many substituents as there are positions available on the aliphatic radical for substitution. Substituents which may be present on an aliphatic radical include but are not limited to halogen atoms such as fluorine, chlorine, bromine, and iodine. Substituted aliphatic radicals include trifluoromethyl, hexafluoroisopropylidene, chloromethyl; difluorovinylidene; trichloromethyl, bromoethyl, bromotrimethylene (e.g. —CH$_2$CHBrCH$_2$—), and the like. For convenience, the term "unsubstituted aliphatic radical" is defined herein to encompass, as part of the "linear or branched array of atoms which is not cyclic" comprising the unsubstituted aliphatic radical, a wide range of functional groups. Examples of unsubstituted aliphatic radicals include allyl, aminocarbonyl (i.e. —$CONH_2$), carbonyl, dicyanoisopropylidene (i.e. —$CH_2C(CN)_2CH_2$—), methyl (i.e. —$CH_3$), methylene (i.e. —$CH_2$—), ethyl, ethylene, formyl, hexyl, hexamethylene, hydroxymethyl (i.e. —$CH_2OH$), mercaptomethyl (i.e. —$CH_2SH$), methylthio (i.e. —$SCH_3$), methylthiomethyl (i.e. —$CH_2SCH_3$), methoxy, methoxycarbonyl, nitromethyl (i.e. —$CH_2NO_2$), thiocarbonyl, trimethylsilyl, t-butyldimethylsilyl, trimethyoxysilypropyl, vinyl, vinylidene, and the like. Aliphatic radicals are defined to comprise at least one carbon atom. A $C_1$-$C_{10}$ aliphatic radical includes substituted aliphatic radicals and unsubstituted aliphatic radicals containing at least one but no more than 10 carbon atoms.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. Aromatic radicals may be "substituted" or "unsubstituted". A substituted aromatic radical is defined as an aromatic radical which comprises at least one substituent. A substituted aromatic radical may comprise as many substituents as there are positions available on the aromatic radical for substitution. Substituents which may be present on an aromatic radical include, but are not limited to halogen atoms such as fluorine, chlorine, bromine, and iodine. Substituted aromatic radicals include trifluoromethylphenyl, hexafluoroisopropylidenebis(4-phenyloxy) (i.e. —$OPhC(CF_3)_2PhO$—), chloromethylphenyl; 3-trifluorovinyl-2-thienyl; 3-trichloromethylphenyl (i.e. 3-$CCl_3Ph$—), bromopropylphenyl (i.e. $BrCH_2CH_2CH_2Ph$—), and the like. For convenience, the term "unsubstituted aromatic radical" is defined herein to encompass, as part of the "array of atoms having a valence of at least one comprising at least one aromatic group", a wide range of functional groups. Examples of unsubstituted aromatic radicals include 4-allyloxyphenoxy, aminophenyl (i.e. $H_2NPh$—), aminocarbonylphenyl (i.e. $NH_2COPh$—), 4-benzoylphenyl, dicyanoisopropylidenebis(4-phenyloxy) (i.e. —$OPhC(CN)_2PhO$—), 3-methylphenyl, methylenebis(4-phenyloxy) (i.e. —$OPhCH_2PhO$—), ethylphenyl, phenylethenyl, 3-formyl-2-thienyl, 2-hexyl-5-furanyl; hexamethylene-1,6-bis(4-phenyloxy) (i.e. —$OPh(CH_2)_6PhO$—); 4-hydroxymethylphenyl (i.e. 4-$HOCH_2Ph$—), 4-mercaptomethylphenyl (i.e. 4-$HSCH_2Ph$—), 4-methylthiophenyl (i.e. 4-$CH_3SPh$—), methoxyphenyl, methoxycarbonylphenyloxy (e.g. methyl salicyl), nitromethylphenyl (i.e. —$PhCH_2NO_2$), trimethylsilylphenyl, t-butyldimethylsilylphenyl, vinylphenyl, vinylidenebis(phenyl), and the like.

The term "a $C_3$-$C_{10}$ aromatic radical" includes substituted aromatic radicals and unsubstituted aromatic radicals containing at least three but no more than 10 carbon atoms. The aromatic radical 1-imidazolyl ($C_3H_2N_2$—) represents a $C_3$ aromatic radical. The benzyl radical ($C_7H_8$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. Cycloaliphatic radicals may be "substituted" or "unsubstituted". A substituted cycloaliphatic radical is defined as a cycloaliphatic radical which comprises at least one substituent. A substituted cycloaliphatic radical may comprise as many substituents as there are positions available on the cycloaliphatic radical for substitution. Substituents which may be present on a cycloaliphatic radical include but are not limited to halogen atoms such as fluorine, chlorine, bromine, and iodine. Substituted cycloaliphatic radicals include trifluoromethylcyclohexyl, hexafluoroisopropylidenebis(4-cyclohexyloxy) (i.e. —$OC_6H_{10}C(CF_3)_2C_6H_{10}O$—), chloromethylcyclohexyl; 3-trifluorovinyl-2-cyclopropyl; 3-trichloromethylcyclohexyl (i.e. 3-$CCl_3C_6H_{10}$—), bromopropylcyclohexyl (i.e. $BrCH_2CH_2CH_2 C_6H_{10}$—), and the like. For convenience, the term "unsubstituted cycloaliphatic radical" is defined herein to encompass a wide range of functional groups. Examples of unsubstituted cycloaliphatic radicals include 4-allyloxycyclohexyl, aminocyclohexyl (i.e. $H_2N C_6H_{10}$—), aminocarbonylcyclopentyl (i.e. $NH_2COC_5H_8$—), 4-acetyloxycyclohexyl, dicyanoisopropylidenebis(4-cyclohexyloxy) (i.e. —$OC_6H_{10}C(CN)_2C_6H_{10}O$—), 3-methylcyclohexyl, methylenebis(4-cyclohexyloxy) (i.e. —$OC_6H_{10}CH_2C_6H_{10}O$—), ethylcyclobutyl, cyclopropylethenyl, 3-formyl-2-terahydrofuranyl, 2-hexyl-5-tetrahydrofuranyl; hexamethylene-1,6-bis(4-cyclohexyloxy) (i.e. —$O C_6H_{10} (CH_2)_6C_6H_{10}O$—); 4-hydroxymethylcyclohexyl (i.e. 4-$HOCH_2C_6H_{10}$—), 4-mercaptomethylcyclohexyl (i.e. 4-$HSCH_2 C_6H_{10}$—), 4-methylthiocyclohexyl (i.e. 4 -$CH_3S C_6H_{10}$—), 4-methoxycyclohexyl, 2-methoxycarbonylcyclohexyloxy (2-$CH_3OCO C_6H_{10}O$—), nitromethylcyclohexyl (i.e. $NO_2CH_2C_6H_{10}$—), trimethylsilylcyclohexyl, t-butyldimethylsilylcyclopentyl, 4-trimethoxysilylethylcyclohexyl (e.g. $(CH_3O)_3SiCH_2CH_2C_6H_{10}$—), vinylcyclohexenyl, vinylidenebis(cyclohexyl), and the like. The term "a $C_3$-$C_{10}$ cycloaliphatic radical" includes substituted cycloaliphatic radicals and unsubstituted cycloaliphatic radicals containing at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_6H_{11}CH_2$—) represents a $C_7$ cycloaliphatic radical.

It has been discovered that the haze exhibited by articles prepared using polymer compositions produced in halo-displacement polymerizations, surprisingly, is due to exceeding a threshold level of residual alkali metal halide in the polymer composition used to fabricate the article. The alkali metal halide is a by-product of the polymerization reaction itself. Reducing the alkali metal halide levels in the polymer composition to 25 ppm or less prior to forming an article from the polymer composition, results in an article with reduced haze levels and of acceptable optical quality. The method of controlling haze provided by the present invention permits the stable and reliable production of articles having haze levels of less than or equal to about 10%. In one embodiment the haze levels exhibited by the articles are less than about 5%. In a preferred embodiment the haze levels are less than about 2%.

As noted, the present invention provides a method for controlling haze in an article comprising a polymer composition generally. Thus, it has been discovered that the level of haze exhibited by an article comprising a polymer composition may be controlled by limiting the amount of alkali metal halide present in the polymer composition from which the article is fabricated to less than about 25 parts per million. The expression "a polymer composition" refers to a composition of matter comprising at least one polymeric species. Thus, "a polymer composition" includes compositions of matter comprising a single polymeric species (e.g. a polyetherimide comprising structural units derived from BPADA, meta-phenylene diamine, and aniline having a molecular weight of 45,000 grams per mole), and compositions of matter comprising a plurality of polymeric species (e.g. a blend of the polyetherimide comprising structural units derived from BPADA, meta-phenylene diamine, and aniline having a molecular weight of 45,000 grams per mole with another polymeric material).

A wide variety of polymeric species are encompassed by the expression "a polymer composition". These polymeric species include polyethersulfones, polyimides, polyetherketones, polyetheretherketones, and polyetherimides. Thus in one embodiment, the present invention provides a method for controlling haze in articles comprising at least one polymeric species selected from the group consisting of polyethersulfones, polyimides, polyetherketones, polyetheretherketones, and polyetherimides. In another embodiment the present invention provides a method for controlling haze in an article comprising at least one polyethersulfone.

Although, the utility of the method of the present invention to control haze is illustrated experimentally herein in terms of controlling haze in articles comprising polyetherimides, the present invention encompasses the control of haze generally in articles fabricated from a wide variety of polymer compositions. Thus, while the description and experimental details which follow focus on control of haze in articles fabricated from polyetherimide compositions, the invention is in no way limited thereto. In its broadest sense, the present invention includes the control of haze in articles fabricated from any and all polymer compositions susceptible to contamination by at least one alkali metal halide wherein the concentration of alkali metal halide exceeds 25 parts per million.

In various embodiments, the present invention provides a method for controlling haze in an article comprising a polyetherimide composition. In one embodiment the method provides an article fabricated using a polyetherimide composition, having 25 parts per million or less of alkali metal halide. The polyetherimide is typically obtained from a precursor polyetherimide comprising 50 parts per million or more of alkali metal halide.

The polyetherimide used according to the method of the present invention typically comprise repeat units having structure of formula I,

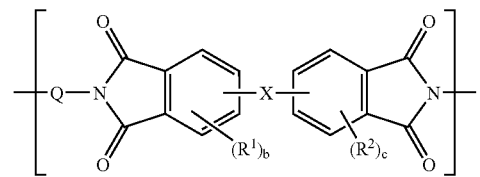

wherein $R^1$ and $R^2$ are independently at each occurrence a halogen atom, a nitro group, a cyano group, a $C_1$-$C_{12}$ aliphatic radical, a $C_3$-$C_{12}$ cycloaliphatic radical, or a $C_3$-$C_{12}$ aromatic radical; b and c are independently integers from 0 to 3; Q is a $C_2$-$C_{22}$ aliphatic radical, a $C_3$-$C_{22}$ cycloaliphatic radical, or a $C_3$-$C_{22}$ aromatic radical; X is a bond, an oxygen atom, a sulfur atom, a sulfinyl group, a sulfonyl group, a selenium atom, a hexafluoroisopropylidene group, a carbonyl group or a linking group having structure II

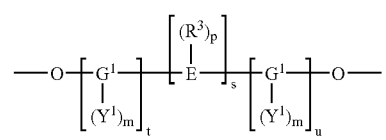

wherein each $G^1$ is independently an $C_3$-$C_{20}$ aromatic radical; E is selected from the group consisting of a $C_3$-$C_{20}$ cycloaliphatic radical, a $C_3$-$C_{20}$ aromatic radical, a $C_1$-$C_{20}$ aliphatic radical, a sulfur-containing linkage, a phosphorus-containing linkage, an ether linkage, a carbonyl group, a tertiary nitrogen atom, and a silicon-containing linkage; $R^3$ is independently at each occurrence a halogen atom, a $C_1$-$C_{20}$ aliphatic radical, $C_3$-$C_{20}$ cycloaliphatic radical, or a $C_3$-$C_{20}$ aromatic radical; $Y^1$ is independently at each occurrence a halogen atom, a nitro group, a cyano group, a $C_1$-$C_{20}$ aliphatic radical, $C_3$-$C_{20}$ cycloaliphatic radical, or a $C_3$-$C_{20}$ aromatic radical; each m is independently a number from zero through the number of positions on each respective $G^1$ available for substitution; p is a whole number from zero through the number of positions on E available for substitution; t is a number greater than or equal to one; s is either zero or one; and u is a whole number including zero, wherein at least one of t, s, and u is not equal to zero.

In one embodiment the structural unit Q is derived from a diamine selected from the group consisting of $C_2$-$C_{22}$ aliphatic diamines, $C_3$-$C_{22}$ cycloaliphatic diamines, and $C_3$-$C_{22}$ aromatic diamines.

In other embodiments X in formula I comprises a divalent organic radical selected from aromatic hydrocarbon radicals having 6 to about 22 carbon atoms and substituted derivatives thereof. In various embodiments said aromatic hydrocarbon radicals may be monocyclic, polycyclic or fused.

In still other embodiments X in formula I comprises divalent aromatic radicals of the general formula (III)

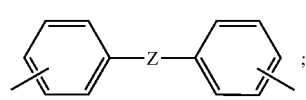

wherein the unassigned positional isomer about the aromatic ring is either meta or para to Z, and Z is a covalent bond or a member selected from the group consisting of an oxygen atom, a sulfur atom, a sulfinyl group, a sulfonyl group, a selenium atom, a hexafluoroisopropylidene group, a carbonyl group and an alkylene or alkylidene group of the formula $C_yH_{2y}$, wherein y is an integer from 1 to 5 inclusive. In some particular embodiments y has the value of one or two. Illustrative linking groups include, but are not limited to, methylene, ethylene, ethylidene, vinylidene, halogen-substituted vinylidene, and isopropylidene. In other particular embodiments the unassigned positional isomer about the aromatic ring in formula III is para to Z.

In various embodiments the two amino groups in the diamines are separated by at least two and sometimes by at least three ring carbon atoms. When the amino group or groups are located in different aromatic rings of a polycyclic aromatic moiety, they are often separated from the direct linkage or from the linking moiety between any two aromatic rings by at least two and sometimes by at least three ring carbon atoms. Illustrative non-limiting examples of aromatic hydrocarbon radicals include phenyl, biphenyl, naphthyl, bis(phenyl)methane, bis(phenyl)-2,2-propane, and their substituted derivatives. In particular embodiments substituents include one or more halogen groups, such as fluoro, chloro, or bromo, or mixtures thereof; or one or more straight-chain-, branched-, or cycloalkyl groups having from 1 to 22 carbon atoms, such as methyl, ethyl, propyl, isopropyl, tert-butyl, or mixtures thereof. In particular embodiments substituents for aromatic hydrocarbon radicals, when present, are at least one of chloro, methyl, ethyl or mixtures thereof. In other particular embodiments said aromatic hydrocarbon radicals are unsubstituted. In some particular embodiments diamines from which $R^1$ may be derived include, but are not limited to, meta-phenylenediamine; para-phenylenediamine; mixtures of meta- and para-phenylenediamine; isomeric 2-methyl- and 5-methyl-4,6-diethyl-1,3-phenylenediamines or their mixtures; bis(4-aminophenyl)-2,2-propane; bis(2-chloro-4-amino-3,5-diethylphenyl)methane, 4,4'-diaminodiphenyl, 3,3'-diaminodiphenyl, 4,4'-diaminodiphenyl ether, 3,3'-diaminodiphenyl ether, 4,4'-diaminodiphenyl sulfone, 3,3'-diaminodiphenyl sulfone, 4,4'-diaminodiphenyl ketone, 3,3'-diaminodiphenyl ketone, and 2,4-toluenediamine. Mixtures of diamines may also be employed.

In a preferred embodiment the diamine may comprise structural units derived from the group consisting of meta-phenylenediamine and para-phenylenediamine. The structural units derived from meta-phenylenediamine and para-phenylenediamine may be present in an amount corresponding to from about 1 to about 99 mole percent and from about 99 to about 1 mole percent respectively. In one embodiment the structural units derived from meta-phenylenediamine is present in an amount corresponding to from about 40 to about 99 mole percent. In a preferred embodiment the structural units derived from meta-phenylenediamine is present in an amount corresponding to from about 50 to about 95 mole percent. In one embodiment structural units derived from para-phenylenediamine is present in an amount corresponding to from about 1 to about 30 mole percent. In a preferred embodiment structural units derived from para-phenylenediamine is present in an amount corresponding to from about 2 to about 15 mole percent. With respect to using a mixture of structural units derived from meta and para-phenylenediamine the term "mole percent" is defined as (number of moles of structural units derived from meta and para-phenylenediamine/total number of moles of diamine-derived structures present in the polymer)* 100.

In one embodiment of the present invention, the polymer composition comprising less than 25 parts per million alkali metal halide is prepared by reacting at least one alkali metal salt of at least one bisphenol, for example the disodium salt of bisphenol A, with at least one bis-halo compound selected from the group consisting of 1,3-bis[N-(4-chlorophthalimido)]benzene; 1,4-bis[N-(4-chlorophthalimido)]benzene; 1,3-bis[N-(3-chlorophthalimido)]benzene; 1,4-bis[N-(3-chlorophthalimido)]benzene; 1-[N-(4-chlorophthalimido)]-3-[N-(3-chlorophthalimido)benzene; 1-[N-(4-chlorophthalimido)]-4-[N-(3-chlorophthalimido)benzene; bis(4-chlorophenyl) sulfone; bis(4-fluorophenyl) sulfone; bis(4-chlorophenyl) sulfone; 1,4-bis(4-chlorobenzoyl)benzene; 1,4-bis(4-fluorobenzoyl)benzene; 1,3-bis(4-chlorobenzoyl)benzene; 1,3-bis(4-fluorobenzoyl)benzene; and mixtures thereof.

The phrase "at least one" means one member of a group has to be necessarily present, however, more than one member of the group may also be present. For example, "at least one bisimide" means that one of the bisimides from the group has to be present, however, there could be more. For example, the polyetherimide precursor may comprise a reaction product of a bisphenol A moiety with 1,3-bis[N-(4-chlorophthalimido)] benzene, however, any one or more of the other bisimides from the group may also be present.

A precursor polyetherimide comprising more than 50 parts per million alkali metal halide is typically obtained when the polyetherimide is synthesized using the halo-displacement process. This overall process involves reacting a diamine with halo-phthalic anhydride to form a bis-halophthalimide, followed by halo-displacement polymerization with an alkali metal salt of a bisphenol, for example the disodium salt of bisphenol A and a phase transfer catalyst. A typical product mixture obtained using the halo-displacement process comprises (i) a precursor made by a halo-displacement polymerization process, (ii) a catalyst, (iii) an alkali metal halide, and (iv) a substantially water-immiscible organic solvent. In one particular embodiment the alkali metal halide comprise an alkali metal chloride, alkali metal fluoride and alkali metal iodide. In a preferred embodiment the alkali metal halide is sodium chloride.

The catalyst present is typically at least one phase transfer catalyst, which in various embodiments is substantially stable at the temperatures employed i.e., in the range of about 125-250° C. Various types of phase transfer catalysts may be employed for this purpose. They include quaternary phosphonium salts of the type disclosed in U.S. Pat. No. 4,273,712, N-alkyl-4-dialkylaminopyridinium salts of the type disclosed in U.S. Pat. Nos. 4,460,778 and 4,595,760, and guanidinium salts of the type disclosed in the aforementioned U.S. Pat. No. 5,229,482. In some embodiments the phase transfer catalysts, by reason of their exceptional stability at high temperatures and their effectiveness in producing high molecular weight aromatic polyether polymers in high yield, comprise the hexaalkylguanidinium and alpha, omega-bis(pentaalkylguanidinium)alkane salts, particularly the chloride salts. In a particular embodiment the catalyst is 1,6-bis(penta-n-butylguanidinium)hexane dibromide. In another particular embodiment the catalyst is hexaethylguanidinium chloride.

Typically, at least one substantially water-immiscible organic solvent is also used in the halo-displacement polymerization process and is therefore typically present in the precursor polyetherimide-containing product mixture. The at least one solvent may completely or at least partially dissolve reaction ingredients.

In one embodiment of the present invention suitable solvents are those which have a boiling point at atmospheric pressure of greater than 110° C., preferably greater than about 125° C.

Substantially water-immiscible means that the organic solvent dissolves to the extent of, in one embodiment, less than about 10 weight percent (wt. %), and in another embodiment less than about 5 wt. % in water. Alternatively, substantially water-immiscible means that water dissolves in the solvent to the extent of, in one embodiment, less than about 10 wt. %, and in another embodiment less than about 5 wt. %. In some embodiments solvents are aromatic solvents, particularly halogenated aromatic solvents such as chloronaphthalene. In particular embodiments solvents include diphenylsulfone, anisole, veratrole, chlorinated benzenes, such as chlorobenzene, dichlorotoluene, 1,2,4-trichlorobenzene, and especially o-dichlorobenzene. Mixtures of such solvents may also be employed. The water miscibility of a preferred solvent, o-DCB is less than 1 percent.

As noted, although simple and flexible, relative to the nitro-displacement process, product polymers prepared via the halo-displacement process typically contain relatively high levels of alkali metal halide (i.e. greater than about 50 ppm alkali metal halide). Moreover, the articles produced using polyetherimide produced by the halo-displacement process were found to have significantly higher haze levels than articles produced using polymer resin prepared using the nitro-displacement process. The haze exhibited by a material generally results from the scattering of light transmitted through the material, by small particulate matter present in the material. As discussed above for certain applications of polyetherimide compositions, such as dishware, film and silicon wafer carriers, low haze is a critical quality factor. Test samples comprising a precursor polyetherimide containing greater that about 50 ppm sodium chloride exhibited higher haze values of about 10 to about 50%. as compared to identical test samples comprising a polyetherimide resin containing 25 ppm or less of sodium chloride which gave haze values of less than about 10%.

In one aspect, the present invention provides for the control of haze in an article comprising a polyetherimide composition by providing a polyetherimide composition comprising 25 ppm or less of alkali metal halide. Thus, a reaction product mixture comprising (i) a precursor polyetherimide made by a halo-displacement polymerization process, (ii) a catalyst, (iii) an alkali metal halide, and (iv) a substantially water-immiscible organic solvent is purified to obtain the desired value of alkali metal halide concentration (i.e. 25 ppm or less). The purification of the mixture to obtain a polyetherimide having 25 ppm or less of alkali metal halide can be carried out in different ways. The precursor polyetherimide may be purified by methods disclosed in copending application U.S. 2002015675, filed on Dec. 21, 2001 which is incorporated by reference herein in its entirety. Exemplary methods are included below.

In one embodiment, the polyetherimide is provided by purifying a product mixture comprising a precursor polyetherimide via a series of steps, said steps comprising:

(a) quenching the mixture comprising a precursor polyetherimide-containing organic phase with acid to provide a quenched mixture comprising an organic phase;

(b) contacting the quenched mixture with water and separating a water-containing phase from the organic phase, using at least one of a liquidaiquid centrifuge, a solid/liquid centrifuge, a counter-current contact apparatus, a liquid-liquid extractor, a liquid-liquid continuous extractor, an extraction column, a static mixer, a coalescer, a homogenizer, or a mixing/settling vessel; and (c) and isolating the polyetherimide;

to provide a polyetherimide containing 25 ppm or less of alkali metal halide. In one embodiment, the acid employed in step (a) comprises phosphoric acid which is typically an aqueous solution of phosphoric acid having sufficient acidity to completely neutralize any basic species present in the precursor polyetherimide-containing organic phase. In some embodiments the use of phorphorous acid in a quenching step is found to improve the overall stability and appearance of the product polyetherimide.

In another embodiment, the polyetherimide is provided by purifying a product mixture comprising a precursor polyetherimide via a series of steps, said steps comprising:

(a) performing at least one solid separation step on the mixture;

(b) quenching the mixture with acid to provide a quenched mixture; and (c) extracting the quenched mixture at least once with water.

In another embodiment the polyetherimide is provided by purifying a product mixture comprising a precursor polyetherimide via a series of steps, said steps comprising;

(a) quenching the mixture with acid to provide a quenched mixture (b) subjecting the quenched mixture to at least one solid separation step; and (c) at least one ion exchange step.

In yet another embodiment the polyetherimide is provided by purifying a product mixture comprising a precursor polyetherimide via a series of steps, said steps comprising (a) quenching the mixture with acid to provide a quenched mixture (b) adding to the quenched mixture an amount of water in a range between about 0.005 wt. % and about 10 wt. % based on the weight of polyetherimide present to provide a multiphase mixture comprising an alkali metal halide;

(c) agitating the multiphase mixture formed in step (a), whereby a portion of the alkali metal halide is converted to a form that can be separated by a solid separation; and (d) performing at least one solid separation step.

The polyetherimide used according to the method of the present invention may further comprise various additives which may be used alone or in combination. These additives include such materials as thermal stabilizers, antioxidants, UV stabilizers, plasticizers, extenders, antistatic agents, catalyst quenchers, mold releasing agents, fire retardants, blowing agents, and processing aids. The different additives that can be incorporated in the polyetherimide resins used according to the method of the present invention are typically commonly used in resin compounding and known to those skilled in the art.

Non-limiting examples of antioxidants include IRGANOX 1010 (tetrakis [3-(3'5'-di-tert-butyl-4'-hydroxyphenyl)propionyloxymethyl]methane; tris(2,4-di-tert-butylphenyl) phosphite; 3,9-di(2,4-di-tert-butylphenoxy)-2,4,8,10-tetraoxa-3,9-diphosphaspiro[5.5]undecane; 3,9-di(2,4-dicumylphenoxy)-2,4,8,10-tetraoxa-3,9-diphosphaspiro [5.5]undecane; tris(p-nonylphenyl)phosphite; 2,2',2"-nitrilo [triethyl-tris[3,3',5,5'-tetra-tertbutyl-1,1'-biphenyl-2'-diyl] phosphite]; 3,9-distearyloxy-2,4,8,10-tetraoxa-3,9-diphosphaspiro[5.5]undecane; dilauryl phosphite; 3,9-di[2, 6-di-tert-butyl-4-methylphenoxy]-2, 4, 8, 10-tetraoxa-3,9-diphosphaspiro[5.5]undecane; tetrakis(2,4-di-tert-butylphenyl)-4,4'-bis(diphenylene)phosphonite; distearyl pentaerythritol diphosphite; diisodecyl pentaerythritol diphosphite; 2,4,6-tri-tert-butylphenyl-2-butyl-2-ethyl-1,3-propanediol phosphite; tristearyl sorbitol triphosphite; tetrakis(2,4-di-tert-butylphenyl)-4,4'-bis(diphenylene)phosphonite; distearyl pentaerythritol diphosphite; diisodecyl pentaerythritol diphosphite; 2,4,6-tri-tert-butylphenyl-2-butyl-2-ethyl-1,3-propanediol phosphite; tristearyl sorbitol triphosphite; tetrakis(2,4-di-tert-butylphenyl)-4,4'-biphenylene diphosphonite; (2,4,6-tri-tert-butylphenyl)-2-butyl-2-ethyl-1,3-propanediolphosphite; triisodecylphosphite; and mixtures of phosphites containing at least one of the foregoing. Tris(2,4-di-tert-butylphenyl) phosphite; 2,4,6-tri-tert-butylphenyl-2-butyl-2-ethyl-1,3-propanediol phosphite; bis(2,4-di-tert-butylphenyl)pentaerythritol diphosphite are especially preferred, as well as mixtures of phosphites containing at least one of the foregoing phosphites, and the like.

Non-limiting examples of processing aids include, Doverlube® FL-599 (available from Dover Chemical Corporation), Polyoxyter® (available from Polychem Alloy Inc.), Glycolube P (available from Lonza Chemical Company), pentaerythritol tetrastearate, Metablen A-3000 (available from Mitsubishi Rayon), neopentyl glycol dibenzoate, and the like.

Non-limiting examples of UV stabilizers include 2-(2'-Hydroxyphenyl)-benzotriazoles, e.g., the 5'-methyl-; 3',5'-di-tert.-butyl-; 5'-tert.-butyl-; 5'-(1,1,3,3-tetramethylbutyl)-; 5-chloro-3',5'-di-tert.-butyl-; 5-chloro-3'-tert.-butyl-5'-methyl-; 3'-sec.-butyl-5'-tert.-butyl-; 3'-alpha-methylbenzyl-5'-methyl; 3'-alpha-methylbenzyl-5'-methyl-5-chloro-; 4'-hydroxy-; 4'-methoxy-; 4'-octoxy-; 3',5'-di-tert.-amyl-; 3'-methyl-5'-carbomethoxyethyl-; 5-chloro-3',5'-di-tert.-amyl-derivatives; and Tinuvin® 234 (available from Ciba Specialty Chemicals). Also suitable are the 2,4-bis-(2'-hydroxyphenyl)-6-alkyl-s-triazines, e.g., the 6-ethyl-; 6-heptadecyl-or 6-undecyl-derivatives. 2-Hydroxybenzophenones e.g., the 4-hydroxy-; 4-methoxy-; 4-octoxy-; 4-decyloxy-; 4-dodecyloxy-; 4-benzyloxy-; 4,2',4'-trihydroxy-; 2,2',4,4'-tetrahydroxy- or 2'-hydroxy-4,4'-dimethoxy-derivative. 1,3-bis-(2'-Hydroxybenzoyl)-benzenes, e.g., 1,3-bis-(2'-hydroxy-4'-hexyloxy-benzoyl)-benzene; 1,3-bis-(2'-hydroxy-4'-octyloxy-benzoyl)-benzene or 1,3-bis-(2'-hydroxy-4'-dodecyloxybenzoyl)-benzene may also be employed. Esters of optionally substituted benzoic acids, e.g., phenylsalicylate; octylphenylsalicylate; dibenzoylresorcin; bis-(-tert.-butyl-benzoyl)-resorcin; benzoylresorcin; 3,5-di-tert.-butyl-4-hydroxybenzoic acid-2,4-di-tert.-butylphenyl ester or -octadecyl ester or -2-methyl-4,6-di-tert.-butyl ester may likewise be employed. Acrylates, e.g., alpha-cyano-beta, beta-diphenylacrylic acid-ethyl ester or isooctyl ester, alpha-carbomethoxy-cinnamic acid methyl ester, alpha-cyano-beta-methyl-p-methoxy-cinnamic acid methyl ester or -butyl ester or N(beta-carbomethoxyvinyl)-2-methyl-indoline may likewise be employed. Oxalic acid diamides, e.g., 4,4'-di-octyloxy-oxanilide; 2,2'-di-octyloxy-5,5'-di-tert.-butyl-oxanilide; 2,2'-di-dodecyloxy-5,5-di-tert.-butyl-oxanilide; 2-ethoxy-2'-ethyl-oxanilide; N,N'-bis-(3-dimethyl-aminopropyl)-oxalamide; 2-ethoxy-5-tert.-butyl-2'-ethyloxanilide and the mixture thereof with 2-ethoxy-2'-ethyl-5,4'-di-tert.-butyl-oxanilide; or mixtures of ortho- and para-methoxy- as well as of o- and p-ethoxy-disubstituted oxanilides are also suitable as UV stabilizers. Preferably the ultraviolet light absorber used in the instant compositions is 2-(2-hydroxy-5-methylphenyl)-2H-benzotriazole; 2-(2-hydroxy-3,5-di-tert-amylphenyl)-2H-benzotriazole; 2-[2-hydroxy-3,5-di-(alpha, alpha-dimethylbenzyl)phenyl]-2H-benzotriazole; 2-(2-hydroxy-5-tert-octylphenyl)-2H-benzotriazole; 2-hydroxy-4-octyloxybenzophenone; nickel bis(O-ethyl 3,5-di-tert-butyl-4-hydroxybenzylphosphonate); 2,4-dihydroxybenzophenone; 2-(2-hydroxy-3-tert-butyl-5-methylphenyl)-2H-benzotriazole; nickel butylamine complex with 2,2'-thiobis(4-tert-butylphenol); 2-ethoxy-2'-ethyloxanilide; 2-ethoxy-2'-ethyl-5,5'-ditert-butyloxanilide or a mixture thereof.

Non-limiting examples of fire retardants include potassium nonafluorobutylsulfonate, potassium diphenylsulfone sulfonate, and phosphite esters of polyhydric phenols, such as resorcinol and bisphenol A.

Non-limiting examples of mold release compositions include esters of long-chain aliphatic acids and alcohols such as pentaerythritol, guerbet alcohols, long-chain ketones, siloxanes, alpha-olefin polymers, long-chain alkanes and hydrocarbons having 15 to 600 carbon atoms.

The articles of the present invention can be made by molding the polyetherimide into useful shapes by a variety of means such as injection molding, extrusion, rotational molding, blow molding and thermoforming to form articles such as, for example, electrical/electronic insulators, dishware, food service trays, electronic chip carriers, circuit boards, medical devices and film and sheet products.

Techniques for the extrusion of sheets, including solid sheets, multi-wall sheets, and multi-wall sheets comprising hollow bodies, are known in the art and described in, for example, U.S. Pat. No. 3,476,627 to Squires, U.S. Pat. No. 3,565,985 to Schrenk et al., U.S. Pat. No. 3,668,288 to Takahashi, U.S. Pat. No. 3,918,865 to Nissel, U.S. Pat. No. 3,933,964 to Brooks, U.S. Pat. No. 4,477,521 to Lehmann et al., and U.S. Pat. No. 4,707,393 to Vetter. There is no particular limitation on the composition of additional layers used to form coextruded sheets. There is no particular limitation on the structure or geometry of the multi-wall sheets. The additional layers may comprise, for example, fluorescing agents to facilitate manufacturing and/or ultraviolet light absorbers to improve weatherability. The thickness of the multi-wall sheet is preferably about 4 mm to about 40 mm, while the thickness of the solid sheet is preferably about 1 mm to about 12 mm.

While the invention has been described with reference to exemplary embodiments, it will be understood by those skilled in the art that various changes may be made and equivalents may be substituted for elements thereof without departing from the scope and spirit of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. The invention is further illustrated by the following non-limiting examples.

Experimental Section

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C.

The haze measurements were made on rectangular injection molded plaques having dimensions of 6"L×2.5"W×0.125"T following ASTM Test Method D1003. A BKY Gardner Haze-guard Plus haze meter was used for the measurements.

The polyetherimide used to find the correlation between alkali metal chloride concentration and haze levels was prepared by following the method disclosed in copending application U.S. 2002015675, filed on Dec. 21, 2001 which is incorporated by reference herein in its entirety.

In comparative Examples 1-10, test samples of polyetherimide comprising unknown particulate matter were scanned using a scanning electron microscopy coupled with elemental characterization using Energy Dispersive Spectroscopy analysis. It was found that the composition of the most common particles in the appropriate size range for scattering light was sodium chloride. Typical sodium chloride particle sizes were found to be in the range of about 1 to about 2 micrometers (μm). Sodium analyses of the samples shown in Table 1 were performed and the correlation between sodium concentration, expressed as parts per million of sodium chloride, and haze was evaluated. To convert the sodium concentration values obtained in the analyses to parts per million sodium chloride the initially obtained value was multiplied by a factor of 2.5.

TABLE I

| Comparative Example No. | Haze % | Sodium chloride ppm |
|---|---|---|
| 1 | 7.8 | 58 |
| 2 | 15.3 | 120 |
| 3 | 5.0 | 25 |
| 4 | 53.9 | 548 |
| 5 | 23.8 | 88 |
| 6 | 70.2 | 483 |
| 7 | 84.2 | 780 |
| 8 | 15.6 | 80 |
| 9 | 23.1 | 123 |
| 10 | 26.0 | 108 |

The results of the correlation between sodium chloride concentration and haze in the Comparative Examples and the Examples are shown in FIG. 1 along with model predictions for the haze generated by sodium chloride particles with average sizes of 1 and 2 μm. It is apparent that there is a good correlation between haze and sodium chloride concentration, and that the correlation is consistent with model predictions based on particle size. The results in FIG. 1 demonstrate that sodium chloride levels of 25 ppm or less are necessary to obtain acceptable haze levels, and that sodium chloride levels of 5 ppm or less would be preferable to assure low haze.

EXAMPLES 1-11

In these examples test parts made from polyetherimide with sodium chloride concentrations of less than 15 ppm were evaluated for their haze levels. The data given in Table 2 show that reduced sodium chloride levels (15 ppm or less) correlate with haze levels below 5%, and that this result has been consistently obtained.

TABLE 2

| Example No. | % HAZE | Sodium chloride ppm |
|---|---|---|
| 1 | 2.6 | 14 |
| 2 | 2.8 | 2.5 |
| 3 | 1.2 | 3.0 |
| 4 | 2.1 | 3.3 |
| 5 | 1.2 | 1.8 |
| 6 | 1.4 | 1.5 |
| 7 | 1.3 | 8.5 |
| 8 | 2.6 | 6.0 |
| 9 | 3.1 | 5.0 |
| 10 | 2.6 | 7.8 |
| 11 | 4.3 | 11 |

Examples 1-11 indicate that if the sodium chloride concentration is maintained at 15 ppm or less a haze level of 5% or less is observed.

The invention has been described in detail with particular reference to preferred embodiments thereof, but it will be understood by those skilled in the art that variations and modifications can be effected within the spirit and scope of the invention.

What is claimed is:

1. A method for controlling haze in an article comprising a polytherimide, said method comprising:
   (a) providing a polytherimide comprising less than 25 parts per million alkali metal halide; and
   (b) fabricating an article from said polytherimide wherein said polyetherimide comprises repeat units having structure I

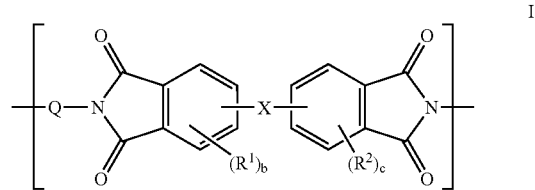

wherein $R^1$ and $R^2$ are independently at each occurrence a halogen atom, a nitro group, a cyano group, a $C_1$-$C_{12}$ aliphatic radical, $C_3$-$C_{12}$ cycloaliphatic radical, or a $C_3$-$C_{12}$ aromatic radical; b and c are independently integers from 0 to 3; Q is a $C_2$-$C_{22}$ aliphatic radical, a $C_3$-$C_{22}$ cycloaliphatic radical or a $C_3$-$C_{22}$ aromatic radical; X is a bond, an oxygen atom, a sulfur atom, a sulfinyl group, a sulfonyl group, a selenium atom, a hexafluoroisopropylidene group, a carbonyl group or a linking group having structure II

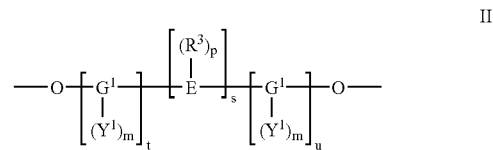

(c) wherein each $G^1$ is independently an $C_3$-$C_{20}$ aromatic radical; E is selected from the group consisting of a $C_3$-$C_{20}$ cycloaliphatic radical, a $C_3$-$C_{20}$ aromatic radical, a $C_1$-$C_{20}$ aliphatic radical, a sulfur-containing linkage, a phosphorus-containing linkage, an ether linkage, a carbonyl group, a tertiary nitrogen atom, and a silicon-containing linkage; $R^3$ is independently at each occurrence a halogen atom, a $C_1$-$C_{20}$ aliphatic radical, $C_3$-$C_{20}$ cycloaliphatic radical, or a $C_3$-$C_{20}$ aromatic radical; $Y^1$ is independently at each occurrence a halogen atom, a nitro group, a cyano group, a $C_1$-$C_{20}$ aliphatic radical, $C_3$-$C_{20}$ cycloaliphatic radical, or a $C_3$-$C_{20}$ aromatic radical; each m is independently a number from zero through the number of positions on each respective $G^1$ available for substitution; p is a whole number from zero through the number of positions on E available for substitution; t is a number greater than or equal to one; s is either zero or one; and u is a whole number including zero, wherein at least one of t, s, and u is not equal to zero.

2. The method according to claim 1 wherein said structural unit Q is derived from a diamine selected from the group consisting of $C_2$-$C_{22}$ aliphatic diamines, $C_3$-$C_{22}$ cycloaliphatic diamines, and $C_3$-$C_{22}$ aromatic diamines.

3. The method according to claim 1 wherein said structure I comprises structural units derived from meta-phenylenediamine, and para-phenylenediamine.

4. The method according to claim 3 wherein said meta-phenylenediamine, and said para-phenylenediamine are present in an amount corresponding to from about 1-99 mole percent and from 99-1 mole percent respectively.

5. The method according to claim 1 wherein said polymer comprising 25 parts per million or less of alkali metal halide is provided by purifying a precursor polymer, said precursor polymer comprising more than about 50 parts per million of alkali metal halide.

6. The method according to claim 5 wherein said precursor polymer comprising more than about 50 parts per million alkali metal halide is prepared by a process which generates alkali metal halide as a by-product.

7. The method according to claim 5 wherein said purifying a precursor polymer comprises subjecting a product mixture comprising (i) a polymer reaction product made by a halo-displacement polymerization process, (ii) a catalyst, (iii) an alkali metal halide, and (iv) a substantially water-immiscible organic solvent, to a series of processing steps, said steps comprising;
  (a) quenching the mixture with acid to provide a quenched mixture comprising an organic phase;
  (b) perform a solid separation step;
  (c) contacting the quenched mixture with water using at least one of a counter-current contact apparatus, an extraction column, a static mixer, a homogenizer, or a mixing vessel;
  (d) separating a water-containing phase from the organic phase, using at least one of a liquid/liquid centrifuge, a counter-current contact apparatus, a liquid-liquid extractor, a liquid-liquid continuous extractor, an extraction column, a coalescer, or a settling vessel; and
  (e) and isolating the polymer.

8. The method according to claim 7 wherein the polymer comprises the reaction product of a bisphenol A moiety with at least one member selected from the group consisting of 1,3-bis[N-(4-chlorophthalimido)]benzene, 1,4-bis[N-(4-chlorophthalimido)]-benzene, 1,3-bis[N-(3-chlorophthalimido)]benzene, 1,4-bis[N-(3-chlorophthalimido)]benzene, 1-[N-(4-chlorophthalimido)]-3-[N-(3-chlorophthalimido) benzene, 1-[N-(4-chlorophthalimido)]-4-[N-(3-chlorophthalimido)benzene, bis(4-chlorophenyl) sulfone, bis(4-fluorophenyl) sulfone; 1,4-bis(4-chlorobenzoyl)benzene and 1,3-bis(4-chlorobenzoyl)benzene.

9. The method according to claim 1 wherein said alkali metal halide is a alkali metal chloride, alkali metal fluoride or an alkali metal iodide.

10. The method according to claim 9 wherein said alkali metal halide is sodium chloride.

11. The method according to claim 7 wherein the organic solvent is o-dichlorobenzene.

12. The method according to claim 1, wherein the article exhibits a haze level less than or equal to 10%.

13. The method according to claim 12, wherein the article exhibits a haze level less than or equal to 5%.

14. A method for controlling haze in an article comprising a polyetherimide composition, said method comprising:

(a) providing a polyetherimide composition comprising less than 25 parts per million alkali metal chloride; and
(b) fabricating an article from said polyetherimide composition;
wherein the polyetherimide comprises repeat units having structure I

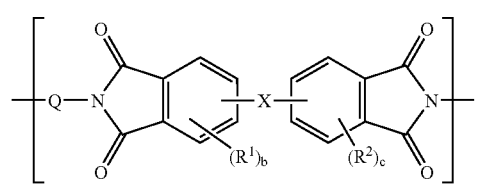

wherein $R^1$ and $R^2$ are independently at each occurrence a halogen atom, a nitro group, a cyano group, a $C_1$-$C_{12}$ aliphatic radical, $C_3$-$C_{12}$ cycloaliphatic radical, or a $C_3$-$C_{12}$ aromatic radical; b and c are independently integers from 0 to 3; Q is a $C_2$-$C_{22}$ aliphatic radical, a $C_3$-$C_{22}$ cycloaliphatic radical, or a $C_3$-$C_{22}$ aromatic radical; X is a bond, an oxygen atom, a sulfur atom, a sulfinyl group, a sulfonyl group, a selenium atom, a hexafluoroisopropylidene group, a carbonyl group or a linking group having structure II

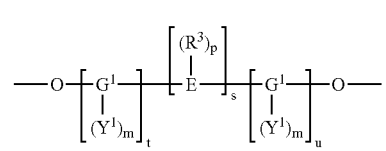

wherein each $G^1$ is independently an $C_3$-$C_{20}$ aromatic radical; E is selected from the group consisting of a $C_3$-$C_{20}$ cycloaliphatic radical, a $C_3$-$C_{20}$ aromatic radical, a $C_1$-$C_{20}$ aliphatic radical, a sulfur-containing linkage, a phosphorus-containing linkage, an ether linkage, a carbonyl group, a tertiary nitrogen atom, and a silicon-containing linkage; $R^3$ is independently at each occurrence a halogen atom, a $C_1$-$C_{20}$ aliphatic radical, $C_3$-$C_{20}$ cycloaliphatic radical, or a $C_3$-$C_{20}$ aromatic radical; $Y^1$ is independently at each occurrence a halogen atom, a nitro group, a cyano group, a $C_1$-$C_{20}$ aliphatic radical, $C_3$-$C_{20}$ cycloaliphatic radical, or a $C_3$-$C_{20}$ aromatic radical; each m is independently a number from zero through the number of positions on each respective $G^1$ available for substitution; p is a whole number from zero through the number of positions on E available for substitution; t is a number greater than or equal to one; s is either zero or one; and u is a whole number including zero, wherein at least one of t, s, and u is not equal to zero.

15. The method of claim 14, wherein the article exhibits a haze level less than or equal to 10%.

16. The method of claim 15, wherein the article exhibits a haze level less than or equal to 5%.

* * * * *